United States Patent
Cazes (10) Patent No.: US 12,172,566 B1
(45) Date of Patent: Dec. 24, 2024

(54) SYSTEM FOR THE INTERIOR LAYOUT OF A VEHICLE, SYSTEM FOR FURNISHING A LOADING AREA OF A VEHICLE AND ASSOCIATED VEHICLE

(71) Applicant: Maurice Cazes, Billère (FR)

(72) Inventor: Maurice Cazes, Billère (FR)

( * ) Notice: Subject to any disclaimer, the term of this patent is extended or adjusted under 35 U.S.C. 154(b) by 0 days.

(21) Appl. No.: 18/660,894

(22) Filed: May 10, 2024

(30) Foreign Application Priority Data

Jun. 23, 2023 (FR) ...................................... 2306592

(51) Int. Cl.
*B60P 3/34* (2006.01)
*B60R 15/04* (2006.01)

(52) U.S. Cl.
CPC ................ *B60P 3/34* (2013.01); *B60R 15/04* (2013.01)

(58) Field of Classification Search
CPC ... B60P 3/32; B60P 3/34; B60R 15/00; B60R 15/02; B60R 15/04
See application file for complete search history.

(56) References Cited

U.S. PATENT DOCUMENTS

| | | | | |
|---|---|---|---|---|
| 6,623,058 | B1 * | 9/2003 | Crean ....................... | B60P 3/34 296/165 |
| 6,637,804 | B1 * | 10/2003 | Crean ....................... | B60P 3/34 296/176 |
| 10,232,806 | B1 * | 3/2019 | Feher ....................... | B60P 3/34 |
| 2022/0410791 | A1 * | 12/2022 | Tezza ....................... | B60R 15/02 |
| 2023/0146252 | A1 * | 5/2023 | Secomb .................... | B60R 15/02 4/599 |
| 2023/0286594 | A1 * | 9/2023 | Culpi ....................... | B62D 25/20 |

FOREIGN PATENT DOCUMENTS

| | | | | |
|---|---|---|---|---|
| AU | 2010202803 | | 2/2012 | |
| CA | 2149110 | A1 * | 11/1996 | ............ B60R 15/02 |
| CN | 209225083 | | 8/2019 | |
| CN | 113771725 | * | 12/2021 | ............ B60R 15/02 |
| DE | 102017212693 | * | 12/2018 | ............ B60R 15/02 |
| EP | 1318049 | * | 12/2002 | ............ B60R 15/04 |

(Continued)

OTHER PUBLICATIONS

Preliminary Research Report and Written Opinion in priority application FR2306592, dated Mar. 8, 2024 (8 pages).

(Continued)

*Primary Examiner* — Gregory A Blankenship
(74) *Attorney, Agent, or Firm* — Tucker Ellis LLP (57) ABSTRACT

The invention relates to a system for the interior layout of a vehicle which comprises a module for the layout of a loading area of the vehicle, the layout module includes a first partition which includes a central passage allowing a separation between a driver's compartment and the loading area of the vehicle, second, third, fourth and fifth partitions which form accommodation spaces of dimensions adapted to furniture elements, at least a first transverse guide means positioned between the second partition and the central passage and a second transverse guide means arranged so that the furniture elements switches from a first folded configuration to a second deployed configuration. The invention further relates to a system for furnishing a loading area of a vehicle comprising a system for the interior layout of a vehicle according to the invention and a sitting device.

11 Claims, 7 Drawing Sheets

(56) References Cited

FOREIGN PATENT DOCUMENTS

| KR | 102253177 | 5/2020 | | |
|---|---|---|---|---|
| KR | 20220146884 | 11/2022 | | |
| WO | WO-2023059745 A1 * | 4/2023 | ................ | B60P 3/34 |

OTHER PUBLICATIONS

Translation of Preliminary Research Report and Written Opinion in counterpart FR2306592, dated Feb. 28, 2024 (6 pages).
European Search Report in counterpart EP23315331, dated Jan. 31, 2024 (5 pages).
Translation of Search Report in counterpart EP23315331, dated Feb. 28, 2024 (5 pages).

* cited by examiner

SYSTEM FOR THE INTERIOR LAYOUT OF A VEHICLE, SYSTEM FOR FURNISHING A LOADING AREA OF A VEHICLE AND ASSOCIATED VEHICLE

TECHNICAL FIELD

The invention relates to the field of the interior layout of vehicles, more particularly of the loading area of vehicles intended to be habitable. The layout system according to the invention can be particularly used for the layout of vehicles that have a loading area for creating an accommodation while being large enough to be able to accommodate said systems. Particularly, the invention relates to a system for the interior layout of a vehicle which comprises a module for the layout of a loading area of the vehicle.

The invention further relates to a system for furnishing a loading area of a vehicle and which comprises in particular the system for the interior layout of a vehicle. The invention also relates to a vehicle fitted with said systems.

PRIOR ART

The known prior art from which the invention was developed is described below.

The development of the autonomous modes of travel saw the rise, a few decades ago, of road vehicles commonly called recreational vehicles and which include "campers" when the vehicles have a unit added onto a driver's chassis/cab, motor-home when the unit integrates the driver's cab or trailer when the vehicle is a converted van. These vehicles comprise all the basic equipment of everyday life that a traveler could want. Indeed, these vehicles often comprise a shower stall, sanitary facilities, a necessary kitchen and a berth area and possibly a vanity cabinet/toilet bowl and, at best for trailers, a common shower/vanity cabinet/toilet bowl area. None of these vehicles, and even less the trailers, have three independent areas: shower stall, vanity cabinet, toilet bowl. The layout of these vehicles is often a challenge for the manufacturers who must maximize the space of these vehicles in order to be able to integrate maximum functionality.

Numerous solutions aimed at optimizing the space available for the layout of these vehicles have emerged, a first solution described in patent document no. KR20220146884 proposes a solution that allows space optimization for the sanitary facility. The proposed system makes it possible to reduce the space occupied by a sanitary facility such as a toilet bowl by securing the area necessary for using the toilet by using a folding stall installed on the side of a piece of furniture. A piece of furniture surrounding a sink is mounted, in which dry toilets are placed. An unfolding partition is mounted on the sink cabinet and allows forming a confined space in which a user can use the toilet.

A second solution described in patent document no. KR102253177 proposes a solution that allows space optimization of the bathroom in a variable manner in order to maximize the usable interior space of the vehicle. The proposed system makes it possible to reduce the space occupied by the bathroom when it is not used and to expand the space of the bathroom, in a variable manner, when the latter is used.

In recent years, the layout of the vans, trailers or pickup trucks is booming. A much less expensive alternative to purchasing a camper, more and more companies are offering their services for the tailor-made layout of old commercial vehicles. Kits are also available for purchase to fit out one's vehicle oneself. However, the layout of these types of vehicles involves making significant compromises regarding the choice of functionalities to be integrated due to less available space compared to campers.

However, the solutions developed for camper-type vehicles remain unsuitable for smaller vehicles and there are no integrated solutions allowing the entire loading area of the vehicle to be directly created. Furthermore, the solutions proposed do not make it possible to recreate separate living rooms. Indeed, as is often the case, the storage area of the vehicle forms a single room in which the elements that characterize different living spaces are arranged.

Thus, there is a need to optimize the interior space in a vehicle while retaining maximum functionality.

The invention aims to overcome the drawbacks of the prior art. Particularly, the aim of the invention is to propose an interior layout system that can be integrated into any type of vehicle, and makes it possible to optimize the available space according to the user's needs while allowing him to maintain a greater number of functionalities than the solutions proposed until now.

The invention further aims to propose a furnishing system including the system for the interior layout of a vehicle, said furnishing system also makes it possible to optimize the space occupied by the sitting devices.

SUMMARY OF THE INVENTION

The invention aims to overcome these drawbacks. The following presents a simplified summary of selected aspects, embodiments and examples of the present invention with the aim of providing a basic understanding of the invention. However, this summary does not constitute an exhaustive overview of all aspects, embodiments and examples of the invention. Its sole aim is to present selected aspects, embodiments and examples of the invention in a concise form as an introduction to the more detailed description of the aspects, embodiments and examples of the invention that follow the summary.

The invention particularly relates to a system for the interior layout of a vehicle, the system comprising a module for the layout of a loading area of the vehicle, the layout module including:
  a first partition which has dimensions adapted to allow a separation between a driver's compartment and the loading area of the vehicle, the first partition further comprising a central passage,
  a second and a third partition substantially perpendicular to the first partition,
  a fourth and a fifth partition substantially perpendicular to the second and to the third partition respectively, so that the first, second and fourth partitions form a first accommodation space of dimensions adapted to a first furniture element and, the first, third and fifth partitions form a second accommodation space of dimensions adapted to a second furniture element,
  at least a first transverse guide means positioned between the second partition and the central passage and a second transverse guide means positioned between the third partition and the central passage,
  the first partition and each transverse guide means being adapted to allow respectively the fixing of the first or of the second furniture element and, are arranged so that the first or the second furniture element switches from a first folded configuration in which the first furniture element or the second furniture element is positioned between the central passage and the second or the third partition, to a second deployed configuration in which the first furniture element or the second furniture element fills the central passage.

The Applicant has developed a system particularly suited to vehicles whose primary purpose of the loading area is not to create a living space. The system according to the invention makes it possible to optimize the space of recreational-type vehicles but more particularly storage spaces of the trailers and vans. The system also makes it possible to optimize the available space by allowing the deployment of several furniture elements within the same space according to the user's choice while leaving maximum available space when the furniture elements are not used.

Depending on other optional characteristics of the system, the latter can optionally include one or more of the following characteristics, alone or in combination:

- the first partition comprises two third transverse guide means respectively adapted to allow the fixing of the first furniture element and of the second furniture element, the two third transverse guide means being respectively arranged so that the first furniture element and the second furniture element switch from the first folded configuration to the second deployed configuration.
- the first furniture element is positioned between the fourth partition and the first partition and the second furniture element is positioned between the fifth partition and the first partition.
- the first furniture element is arranged to be able to switch to the deployed configuration when the second furniture element is in the folded position and vice versa.
- the layout module includes a sixth partition substantially perpendicular to the third partition so that the third, fifth and sixth partitions form a third accommodation space adapted to accommodate a water supply and discharge.
- the first furniture element corresponds to a stall equipped with a door, the stall being arranged to allow, in the deployed configuration, the opening and closing of said door.

According to a second object, the invention relates to a system for furnishing a loading area of a vehicle, said system comprising:
- un system for the interior layout of a vehicle according to the invention,
- a sitting device including:
  - a seat comprising a sitting on which a plurality of fixing elements are mounted,
  - a seat support comprising a plurality of fixing orifices arranged to receive the fixing elements,
  - a securing/uncoupling means positioned in the seat support and comprising a plurality of openings adapted to allow the passage of the fixing elements, the securing/uncoupling means being further arranged to allow reversible fixing between the seat and the seat support.

Such a system also makes it possible to optimize the space by offering the possibility of retaining or not a sitting device depending on the needs.

Depending on other optional characteristics of the method, the latter can optionally include one or more of the following characteristics, alone or in combination:

- the seat comprises a backrest connected to the sitting, and in which the seat is arranged to be fixed to the seat support along a first position in which the plurality of fixing orifices coincide with at least two fixing elements and along a second position in which the plurality of the fixing orifices coincide with at least two other fixing elements. This allows the sitting device to switch into different configurations which can be adapted either when the vehicle is moving or when the vehicle is stationary.
- in the first position, the backrest is substantially perpendicular to a longitudinal axis of the first partition, and in the second position, the backrest is substantially parallel to the longitudinal axis of the first partition.

According to a third object, the invention relates to a vehicle comprising a system for the interior layout according to the invention or a furnishing system according to the invention.

According to other optional characteristics of the vehicle, the latter can comprise, in the rear part, a reversible opening means arranged to switch from an open position allowing access to the loading area of the vehicle to a closed position, said vehicle comprising a transparent tailgate mounted on a frame of the rear part of the vehicle, said transparent tailgate being arranged to switch from a first deployed configuration when the reversible opening means is in the open position, to a second folded configuration when the reversible opening means is in the closed position.

BRIEF DESCRIPTION OF THE DRAWINGS

Other characteristics and advantages of the invention will be better understood upon reading the following description and with reference to the appended drawings, given by way of illustration and without limitation.

The figures do not necessarily respect scales, in particular in thickness, for purposes of illustration.

Aspects of the present invention are described with reference to block diagrams of apparatuses (systems) according to embodiments of the invention.

DESCRIPTION OF THE EMBODIMENTS

A summary of the invention and the associated vocabulary are described below, before presenting the drawbacks of the prior art, then finally showing in more detail how the invention overcomes them.

The terms "fixed" or "fix", within the meaning of the invention correspond to the direct or indirect association of one element relative to another without movement of these elements one relative to the other, immovable or removable with one or more intermediate elements.

The term "removable" within the meaning of the invention corresponds to the ability to be detached, removed or dismounted easily without having to destroy fixing means either because there is no fixing means or because the fixing means are easily and quickly dismountable (e.g. notch, screw, tab, lug, clips). For example, by removable, it should be understood that the object is not fixed by welding or by another means not intended to detach the object.

Thus, the invention relates to a system 1 for the interior layout of a vehicle, the system 1 comprising a module for the layout of a loading area of the vehicle. Preferably, for the interior layout of a recreational-type vehicle, preferably a trailer and/or a van.

The layout module according to the invention includes a first partition, a second partition, a third partition, a fourth partition and a fifth partition, at least a first and a second transverse guide means.

As mentioned previously, the layout module according to the invention is intended to be installed inside the vehicle, more particularly in a space defining a storage or loading area of the vehicle. For example, the storage or loading area of the vehicle can correspond to the entire interior space of the vehicle apart from the space dedicated to the driver's compartment. Preferably, the storage area is located directly behind the driver's compartment of the vehicle.

Thus, the layout module preferably has dimensions adapted to the interior space of the vehicle, delimited by the body of the vehicle, so as to be easily integrated thereinto. Preferably, the elements which constitute the layout module can be fixed to a supporting structure 70 arranged to rest on the floor of the loading area of the vehicle. The supporting structure 70 can also be fixed to the floor of the loading area of the vehicle. In addition, a secondary floor 80 can be mounted on the supporting structure 70. For this, the supporting structure 70 can comprise a plurality of joists on which the elements of the layout module or the secondary floor 80 can be fixed.

Figure 1:
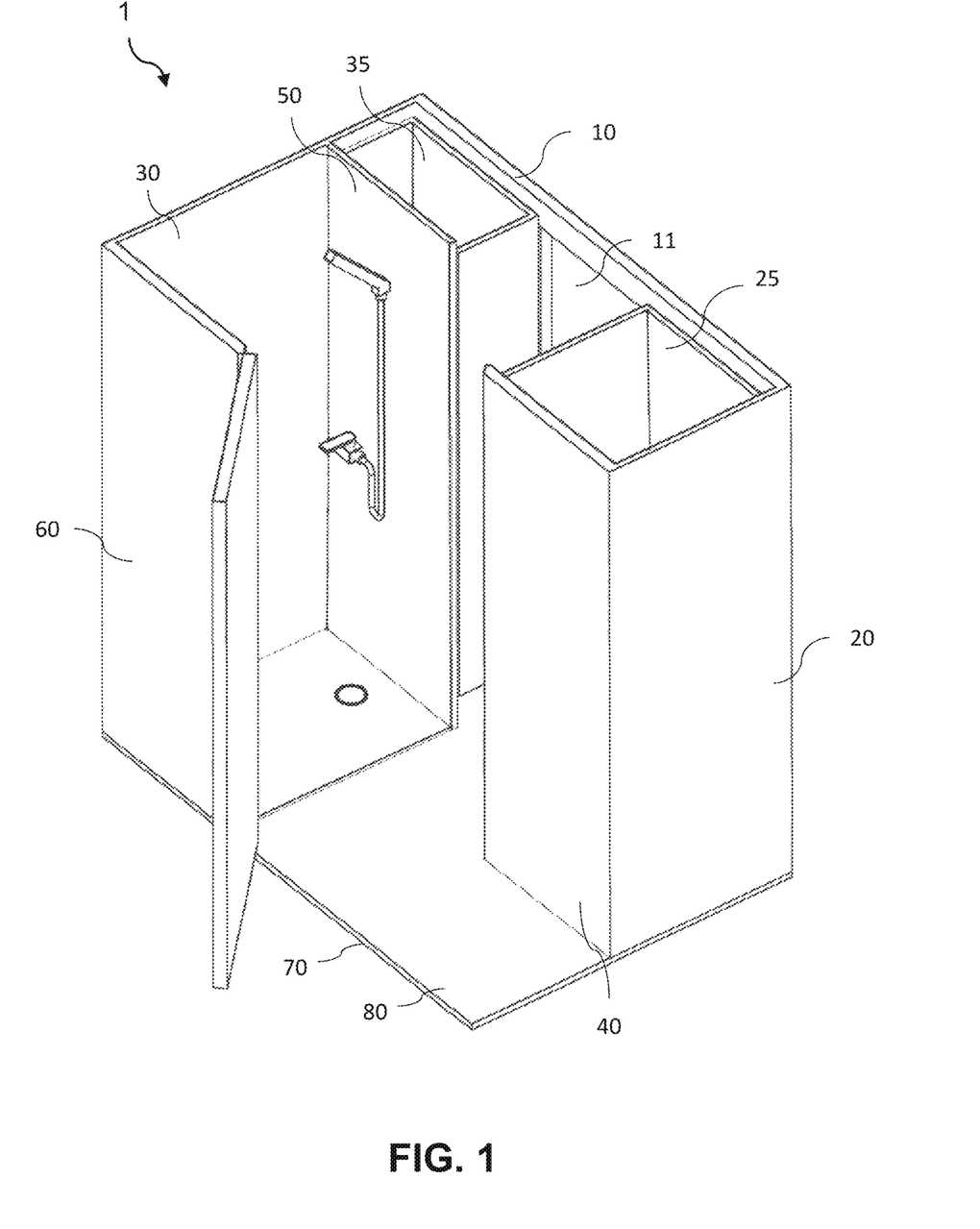
FIG. 1 represents a diagram of one embodiment of a system for the interior layout of a vehicle according to the invention seen from the side.

In the invention, as presented in relation to FIG. 1, the layout module of a system 1 for the interior layout of a vehicle includes a first partition 10 which has dimensions adapted to allow a separation between a driver's compartment and the loading area of the vehicle.

The first partition 10 further comprises a central passage 11. The central passage 11 is preferably arranged to allow access, from the layout module, to the driver's compartment and vice versa.

Still in the invention, the second and third partitions 20, 30 of the layout module are substantially perpendicular to the first partition 10.

Furthermore, the fourth and fifth partitions 40, 50 are respectively positioned substantially perpendicular to the second and third partitions 20, 30. More particularly, the first, second and fourth partitions 10, 20, 40 form a first accommodation space. The first, second and fourth partitions 10, 20, 40 which form the first accommodation space thus have dimensions adapted to a first furniture element 25.

In addition, the first, third and fifth partitions 10, 30, 50 form a second accommodation space of dimensions adapted to a second furniture element 35.

Figure 2:
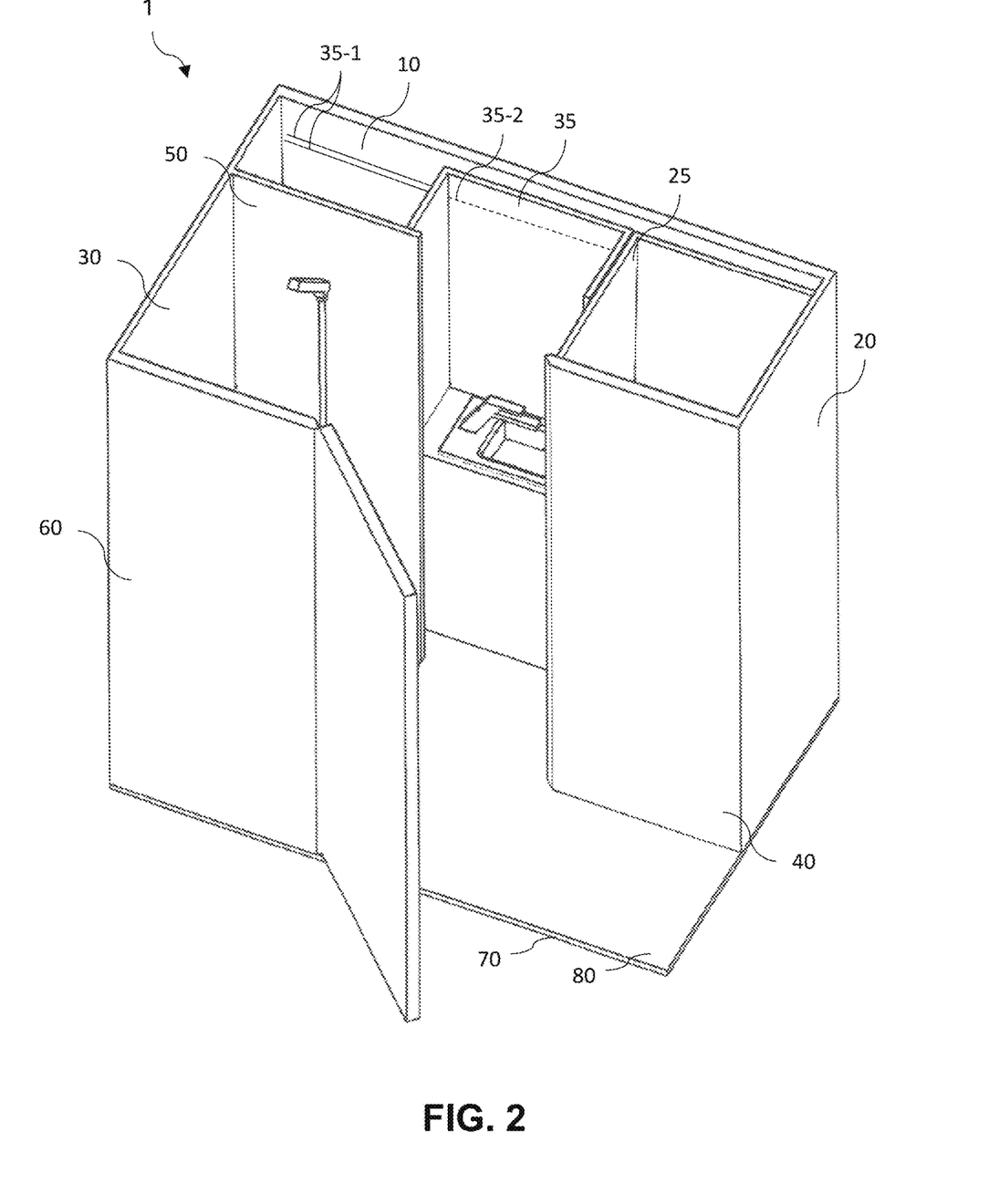
FIG. 2 represents a diagram of one embodiment of a system for the interior layout of a vehicle according to the invention seen from the front.

According to the invention, the first transverse guide means 25-1, 25-2 of the layout module is positioned between the second partition 20 and the central passage 11 (see FIG.3) and the second transverse guide means 35-1, 35-2 is positioned between the third partition 30 and the central passage 11 (see FIG. 2).

Figure 3:
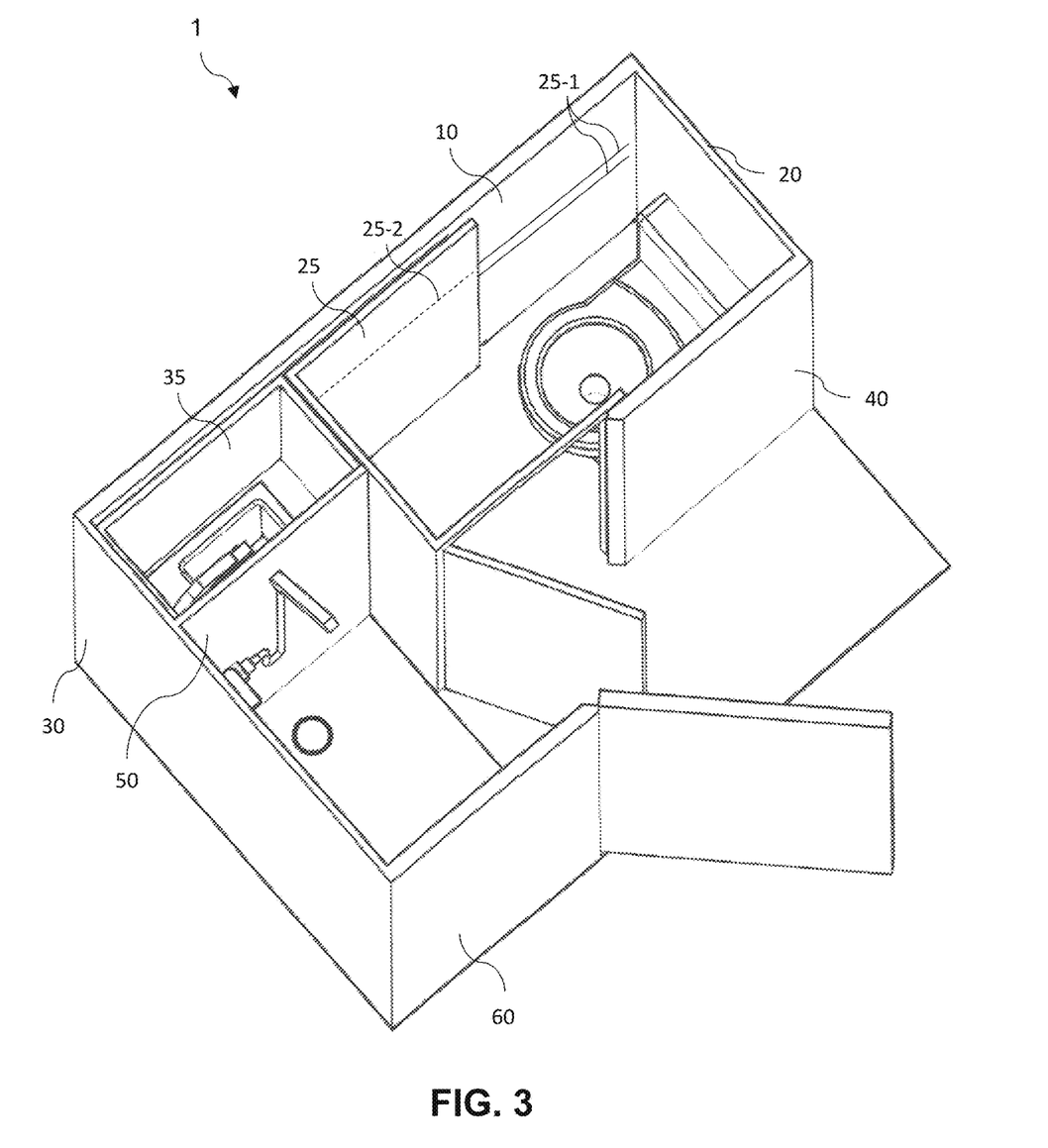
FIG. 3 represents a diagram of one embodiment of a system for the interior layout of a vehicle according to the invention seen from above.

Furthermore, the first partition 10 and the first and second transverse guide means 25-1, 25-2, 35-1, 35-2 are adapted to allow the fixing of the first or of the second furniture element 25, 35. Once fixed on the first and second transverse guide means 25-1, 25-2, 35-1, 35-2, the furniture elements 25, 35 can undergo a translational movement along the axis of the transverse guide means 25-1, 25-2, 35-1, 35-2.

In order to optimize the space available, as presented in relation to FIGS. 2 and 3, the first partition 10 and each transverse guide means are arranged so that the first or the second furniture element 25, 35 switches from a first folded configuration in which the first furniture element 25 or the second furniture element 35 is positioned between the central passage 11 and the second or the third partition 20, 30, to a second deployed configuration in which the first furniture element 25 or the second furniture element 35 fills the central passage 11. Such an arrangement thus makes it possible to use the same space to deploy different furniture elements offering various functionalities to a user while ensuring the possibility of access to the driver's compartment when the furniture elements 25, 35 are in the folded configuration.

To further optimize the space occupied by the furniture elements, the first furniture element 25 can be arranged to be able to switch to the deployed configuration when the second furniture element 35 is in the folded position and vice versa. This thus makes it possible to use the first or the second furniture element 25, 35 only when the furniture element which is not used is in the folded configuration.

Preferably, the second transverse guide means can be positioned on the high part of the first partition 10, between the second and third partitions 20, 30, adjacent to the first partition 10, and the central passage 11.

Advantageously, the first and second transverse guide means can be equipped with locking devices in order to allow blocking the transverse guide means in different positions. Furthermore, the first and second transverse guide means can comprise a system of stops with end-of-stroke dampers.

As examples, the first and second transverse guide means can respectively correspond to a roller or ball guide rail fixed directly to the first partition 10. In addition, the first and second transverse guide means can correspond to telescopic ball or roller slides and which allow total or partial extraction up to 200% of the length of the telescopic slide.

In order to facilitate the switching from the folded configuration to the deployed configuration of the different furniture elements, the first partition 10 can comprise two third transverse guide means respectively adapted to allow the fixing of the first furniture element 25 and of the second furniture element 35. The two third transverse guide means can be respectively arranged so that the first furniture element 25 and the second furniture element 35 switch from the first folded configuration to the second deployed configuration. The third transverse guide means are preferably positioned on the low part of the first partition 10, between the second and third partitions 20, 30, adjacent to the first partition 10, and the central passage 11.

In one particular embodiment of a system 1 for the interior layout of a vehicle according to the invention, the first furniture element 25 can correspond to a stall equipped with a door, the stall being arranged to allow, in the deployed configuration, the opening and closing of said door. Optionally, said stall can comprise a toilet room of a known type, in particular which can be found in most converted vans.

Alternatively or additionally, the second furniture element 35 can correspond to a piece of furniture equipped with a sink and with a system for the connection to a water supply and discharge.

In order to limit as much as possible the space occupied by the furniture elements, the first furniture element 25 can be positioned between the fourth partition 40 and the first partition 10 and the second furniture element 35 can be positioned between the fifth partition 50 and the first partition 10.

As already mentioned, one of the objectives of the invention is to allow the formation of functional rooms while optimizing the space available. Thus, in one embodiment of a system 1 for the interior layout of a vehicle, the layout module can include a sixth partition 60, as presented in relation to FIGS. 1 to 3, substantially perpendicular to the third partition 30 so that the third, fifth and sixth partitions 30, 50, 60 form a third accommodation space adapted to accommodate a water supply and a discharge. In this embodiment, the fifth partition 50 is positioned at a distance from the first partition 10 adapted to the dimensions of the second furniture element 35 and sufficient for the second furniture element 35 to occupy, in the folded configuration, substantially the whole space between the first partition 10 and the fifth partition 50. Furthermore, the fifth partition 50 is also used to form the third accommodation space, thus making it possible to further optimize the available space.

According to a second aspect, the invention relates to a system for furnishing a loading area of a vehicle. Such a system comprises a system 1 for the interior layout of a vehicle according to the invention and a sitting device. Preferably, for furnishing a loading area of a recreational-type vehicle, preferably a trailer and/or a van.

Figure 4A:
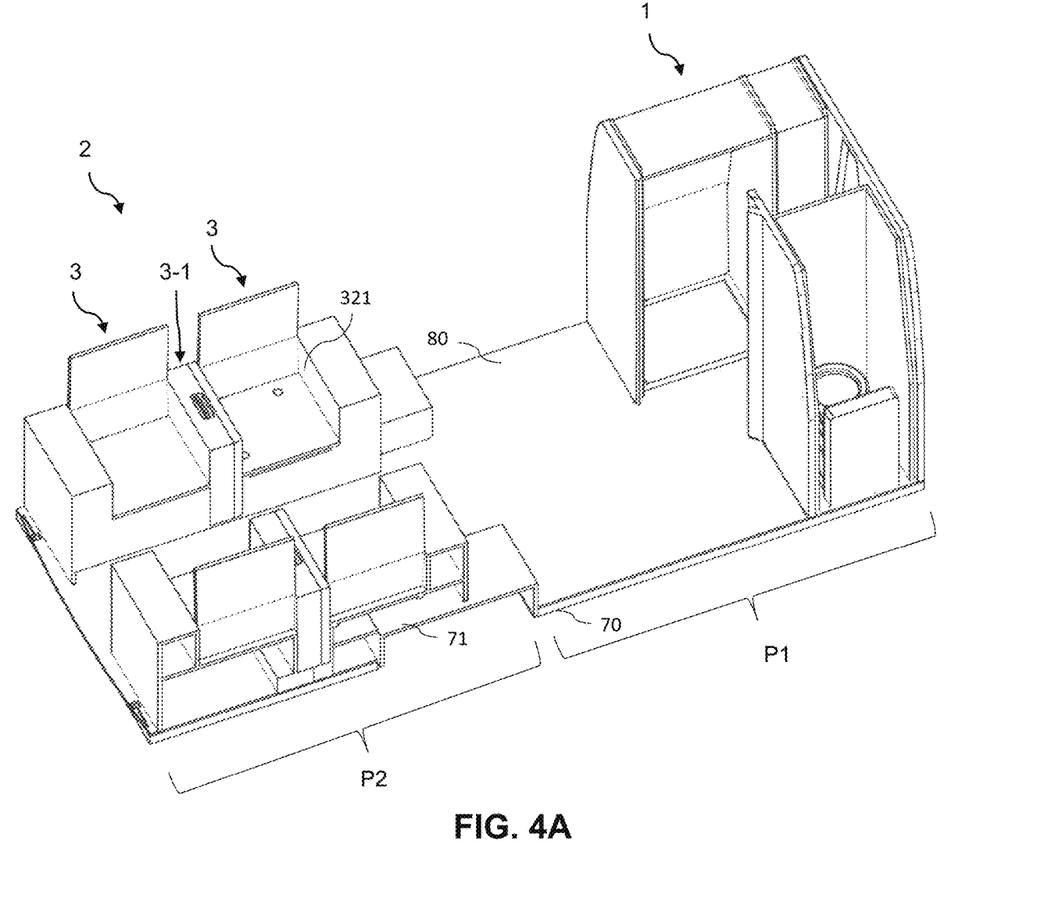
FIG. 4A represents a diagram of one embodiment of a system for furnishing a loading area of a vehicle according to the invention in which the sitting devices are presented according to a first configuration.
Figure 4B:
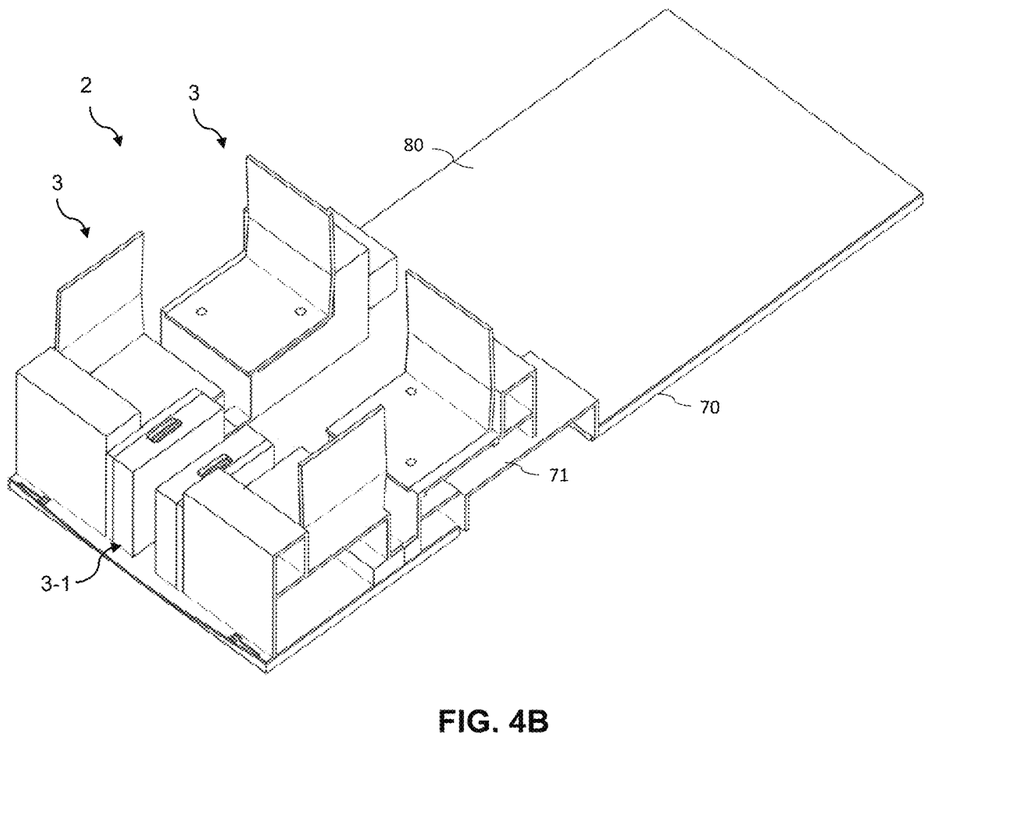
FIG. 4B represents a diagram of one embodiment of a system for furnishing a loading area of a vehicle according to the invention in which the sitting devices are presented according to a second configuration.

As shown in FIG. 4A, the furnishing system 2 of a loading area of a vehicle comprises a sitting device 3 and a system 1 for the interior layout of a vehicle according to the invention. In FIGS. 4A and 4B, the furnishing system 2 of a loading area is presented in two parts, the first part P1 is the part intended to be located behind the driver's compartment of the vehicle. The second part P2 mainly represented in FIGS. 4A and 4B is the part intended to be located at the back of the vehicle, opposite to the driver's compartment.

Like the layout module, at least part of the elements which constitute the sitting device 3 can be fixed to the supporting structure 70 arranged to rest on the floor of the loading area of the vehicle. The supporting structure 70 can also comprise a raised structure 71 adapted to match the shape of the wheel arch commonly found at the back of the loading area of some types of commercial vehicles, such as vans, pickup trucks.

FIG. 4A shows one embodiment of a furnishing system 2 according to the invention which comprises four sitting devices 3 positioned, two by two, facing each other. Each pair of sitting device 3 is separated by a removable stowage element 3-1 arranged so that one side of the removable stowage element 3-1 forms an armrest. The stowage element 3-1 can take a parallelepiped shape and comprise a hollow space serving as stowage for various accessories.

In the configuration shown in FIG. 4A, the sitting devices 3 are suitable for use when the vehicle is not moving. In the configuration shown in FIG. 4B, the sitting devices 3 are suitable for use when the vehicle is moving. Indeed, two of the sitting devices positioned facing each other can switch into a second position, by rotation. In this configuration, the stowage element 3-1 can be removed in order to allow a user to sit down and position their lower limbs, instead of the stowage element 3-1, between a first and a second sitting device 3.

Figure 5:
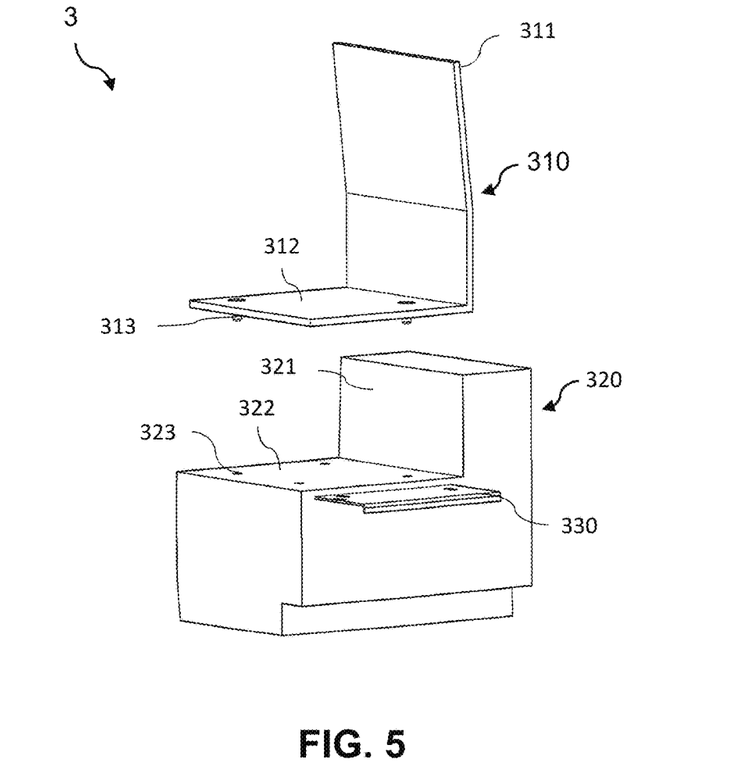
FIG. 5 represents a diagram of one embodiment of a sitting device according to the invention.

Thus, as illustrated in FIG. 5, the sitting device 3 according to the invention includes a seat 310 comprising a sitting 312 on which a plurality of fixing elements 313 is mounted.

As an illustrative example, the fixing elements 313 can correspond to grooved studs, the groove of the stud corresponding to a slotted part of the stud whose diameter is smaller than that of the stud (of the non-slotted part of the stud).

The sitting device 3 according to the invention further includes a seat support 320 a plurality of fixing orifices 323 arranged to receive the fixing elements 313.

Preferably, the fixing orifices 323 are arranged to receive the fixing elements 313 and to hold the seat 310 to the seat support 320. In particular, the fixing orifices 323 can be arranged to allow a connection by embedding of the fixing elements 313. Even more preferably, the fixing orifices 323 have a first recess whose diameter is adapted to accommodate the grooved stud. The fixing orifices 323 can further have a second recess which has a diameter smaller than that of the first recess and which makes it possible to accommodate the slotted part called "slot" of the stud and thus hold the seat 310 to the seat support 320.

Still in the invention, in order to facilitate the positioning of the sitting device 3, said sitting device includes a securing/uncoupling means 330 positioned in the seat support 320. According to one embodiment, the securing/uncoupling means 330 can be integrated into a recess made in the seat support 320. Openings are thus made in the seat support 320 in order to allow the securing/uncoupling of the seat 310 to the seat support 320.

The securing/uncoupling means 330 comprises a plurality of openings 331 adapted to allow the passage of the fixing elements 313 and is further arranged to allow reversible fixing between the seat 310 and the seat support 320. More particularly, the securing/uncoupling means 330 can be arranged to allow adequate positioning between the fixing elements 313 and the fixing orifices 323 and thus ensure their connections.

Preferably, the openings 331 are arranged to receive the fixing elements 313 and to hold the seat 310 to the seat support 320. In particular, the openings 331 can be arranged to allow connection by embedding of the fixing elements 313. Even more preferably, the openings 331 have a recess whose diameter is adapted to accommodate the grooved stud.

In one embodiment of the invention, the application of a horizontal force to the securing/uncoupling means 330 along a first direction allows the connection between the fixing elements 313 and the fixing orifices 323, while the application of a horizontal force to the securing/uncoupling means 330 along a second direction, opposite to the first direction, allows the uncoupling between the fixing elements 313 and the fixing orifices 323.

More particularly, when the fixing elements 313 are grooved studs, the application of a horizontal force to the securing/uncoupling means 330 along a first direction makes it possible to accommodate the slotted part called "groove" of the stud in the second recess and thus hold the seat 310 to the seat support 320.

Figure 6:
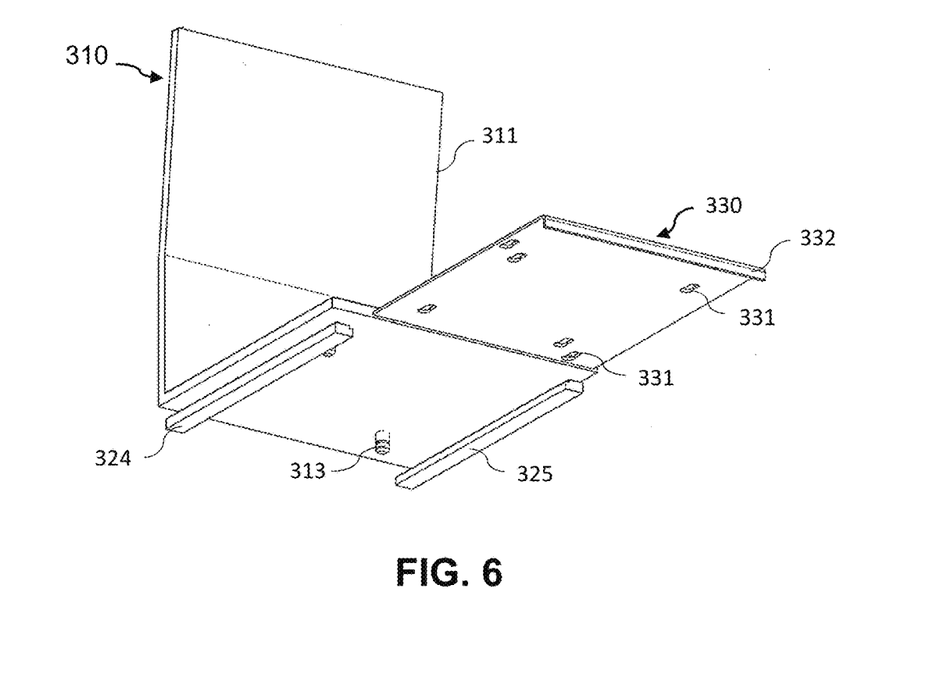
FIG. 6 represents a diagram of one embodiment of part of a sitting device according to the invention.

As shown in FIG. 6, to facilitate the securing/uncoupling of the seat 310 to the seat support 320, the securing/uncoupling means 330 can comprise a gripping means 332 allowing a user to apply a force by pulling or by pushing along a first or a second direction, the securing/uncoupling means 330. The gripping means 332 can take the form of a vertical rim extending along one side of the securing/uncoupling means 330.

Alternatively or additionally, in order to facilitate the positioning of the seat 310 and of the securing/uncoupling means 330 relative to the seat support 320, more particularly the fixing elements 313 and the openings 331 relative to the fixing orifices 323, the seat support 320 can comprise positioning supports 324, 325 on which the securing/uncoupling means 330 can be mounted, for example in a recess made in the seat support 320, so as to be able to slide. The positioning supports 324, 325 advantageously have dimensions adapted to the securing/uncoupling means 330.

In another embodiment of a furnishing system 2 according to the invention, the seat 310 can comprise a backrest 311 connected to the sitting 312. The seat 310 can further be arranged to be fixed to the seat support 320 along a first position in which the plurality of the fixing orifices 323 coincide with at least two fixing elements 313 and along a second position in which the plurality of the fixing orifices 323 coincide with at least two other fixing elements 313.

Indeed, fixing orifices 323 can be positioned on the seat support 320 in such a way that the seat 310 can be fixed to the seat support 320 in different positions by rotation of said seat.

By way of non-limiting example, the seat 310 can further be arranged to be fixed to the seat support 320 along a first position in which the backrest 311 is substantially perpendicular to a longitudinal axis of the first partition 10. The seat 310 can further be arranged to be fixed to the seat support 320 along a second position in which the backrest 311 is substantially parallel to the longitudinal axis of the first partition 10.

As illustrated in FIGS. 4A and 4B, the furnishing system 2 according to the invention can comprise a plurality of sitting devices 3. In this representation, four sitting devices 3 separated, two by two, by a removable stowage element 3-1 are represented, the sitting devices are positioned along a position in which the backrest 311 is substantially perpendicular to a longitudinal axis of the first partition 10. This position can in particular be used when the vehicle is not moving. Furthermore, in this position, a mattress can be disposed on the sittings 312 of the sitting devices 3.

Conversely, when the vehicle is moving, the sitting devices can be positioned along a position in which the backrest 311 is substantially parallel to the longitudinal axis of the first partition 10. Thus, by rotation of the sitting devices 3, the backrest 311 of the sitting device 3 can be positioned along a backrest 321 of the seat support 320, substantially perpendicular to a sitting support 322 which comprises the fixing orifices 323. Furthermore, in this position, up to four users can sit when the vehicle is moving. It is thus expected that each sitting device 3 can comprise a safety belt, of known type, which makes it possible to keep the user's body secured to the seat 310.

According to a third aspect, the invention relates to a vehicle comprising a system 1 for the interior layouts according to the invention or a furnishing system 2 according to the invention.

As non-limiting examples, the vehicle can be of the motorized recreational type such as motorhomes, or be towable such as caravans of the small van or van type.

Figure 7:
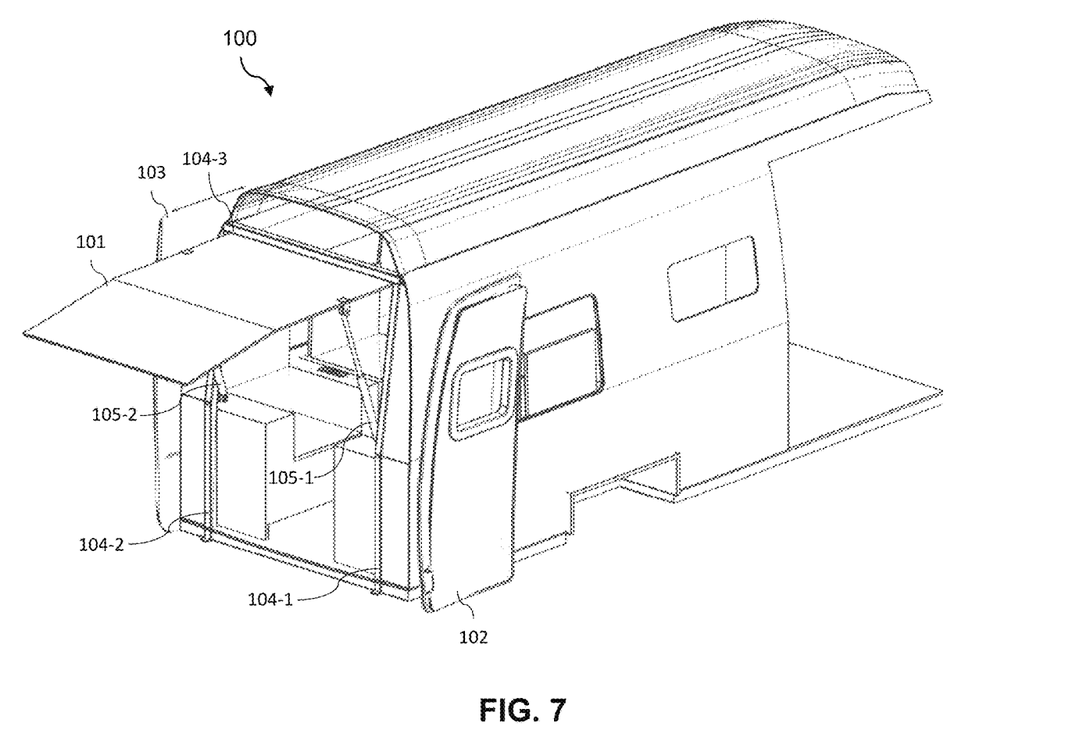
FIG. 7 represents a diagram of part of a vehicle according to the invention and comprising a transparent tailgate.

In one particular embodiment, the vehicle can further comprise, in the rear part, a transparent tailgate 101 and a reversible opening means 102, 103.

The reversible opening means can be composed of a first and a second swing door 102, 103 as illustrated in FIG. 7. Furthermore, the reversible opening means is arranged to switch from an open position allowing access to the loading area of the vehicle to a closed position.

The transparent tailgate 101 is mounted on a frame of the rear part of the vehicle. The transparent tailgate 101 is arranged to switch from a first deployed configuration when the reversible opening means 102, 103 is in the open position, to a second folded configuration when the reversible opening means 102, 103 is in the closed position. In the deployed configuration, the transparent tailgate 101 is substantially parallel to a longitudinal axis of the vehicle 100, while in the folded configuration, the transparent tailgate 101 is substantially perpendicular to a longitudinal axis of the vehicle 100.

In order to allow the opening and closing of the transparent tailgate 101, the vehicle 100 can comprise at least one tailgate damper 105-1, 105-2 whose pressure allows the transparent tailgate 101 to remain in the deployed configuration.

As an illustrative example, the frame on which the transparent tailgate 101 is mounted can be a body part of the vehicle 100.

Alternatively, the frame can be adapted to be fixed directly to the floor of the vehicle and to part of the vehicle body. The frame can be composed of two longitudinal profiles 104-1, 104-2, fixed to the floor of the vehicle, and extending over all or part of the height of the reversible opening means 102, 103. A tailgate damper 105-1, 105-2 can be fixed to each longitudinal profile 104-1, 104-2. The upper part of the transparent tailgate 101 can also be coupled to a transverse profile 104-3, connecting the two longitudinal profiles, by at least one connecting element allowing the switching from the folded configuration to the deployed configuration.

The invention can be the subject of numerous variants and applications other than those described above. Particularly, unless otherwise indicated, the different structural and functional characteristics of each of the implementations described above should not be considered as combined and/or closely and/or inextricably linked to each other, but on the contrary as simple juxtapositions. Furthermore, the structural and/or functional characteristics of the different embodiments described above can be subject in whole or in part to any different juxtaposition or any different combination.

The invention claimed is:

1. A system for an interior layout of a vehicle, the system comprising a module for a layout of a loading area of the vehicle, the layout module including:
   a first partition which has dimensions adapted to allow a separation between a driver's compartment and the loading area of the vehicle, the first partition further comprising a central passage,
   a second partition and a third partition each substantially perpendicular to the first partition,
   a fourth partition and a fifth partition each substantially perpendicular to the second partition and to the third partition respectively, so that the first, second and fourth partitions form a first accommodation space of dimensions adapted to a first furniture element, and the first, third and fifth partitions form a second accommodation space of dimensions adapted to a second furniture element,
   at least a first transverse guide means positioned between the second partition and the central passage and a second transverse guide means positioned between the third partition and the central passage, the first partition and each said transverse guide means being adapted to allow respectively fixing of the first furniture element or of the second furniture element, and being arranged so that the first furniture element or the second furniture element switches from a first folded configuration in which the first furniture element or the second furniture element is positioned between the central passage and the second or the third partition, to a second deployed configuration in which the first furniture element or the second furniture element fills the central passage.

2. The system for the interior layout of a vehicle according to claim 1, wherein the first partition comprises two third transverse guide means respectively adapted to allow the fixing of the first furniture element and of the second furniture element, the two third transverse guide means being respectively arranged so that the first furniture element and the second furniture element switch from the first folded configuration to the second deployed configuration.

3. The system for the interior layout of a vehicle according to claim 1, wherein the first furniture element is positioned between the fourth partition and the first partition and the second furniture element is positioned between the fifth partition and the first partition.

4. The system for the interior layout of a vehicle according to claim 1, wherein the first furniture element is arranged to be able to switch to the deployed configuration when the second furniture element is in the folded position and vice versa.

5. The system for the interior layout of a vehicle according to claim 1, wherein the layout module includes a sixth partition substantially perpendicular to the third partition so that the third, fifth and sixth partitions form a third accommodation space adapted to accommodate a water supply and discharge.

6. The system for the interior layout of a vehicle according to claim 1, wherein the first furniture element corresponds to a stall equipped with a door, the stall being arranged to allow, in the deployed configuration, the opening and closing of said door.

7. A system for furnishing a loading area of a vehicle, said system comprising:
   the system for the interior layout of a vehicle according to claim 1,
   a sitting device including:
      a seat comprising a sitting on which a plurality of fixing elements are mounted,
      a seat support comprising a plurality of fixing orifices arranged to receive the fixing elements,
      a securing/uncoupling means positioned in the seat support and comprising a plurality of openings adapted to allow passage of the fixing elements, the securing/uncoupling means being further arranged to allow a reversible fixing between the seat and the seat support.

8. The furnishing system according to claim 7, wherein the seat comprises a backrest connected to the sitting, and wherein the seat is arranged to be fixed to the seat support along a first position in which the plurality of fixing orifices coincide with at least two of said fixing elements and along a second position in which the plurality of fixing orifices coincide with at least two others of said fixing elements.

9. The furnishing system according to claim 8, wherein:
   in the first position, the backrest is substantially perpendicular to a longitudinal axis of the first partition,
   in the second position, the backrest is substantially parallel to the longitudinal axis of the first partition.

10. A vehicle comprising the furnishing system according to claim 7.

11. The vehicle according to claim 10, said vehicle comprising, in a rear part, reversible opening means arranged to switch from an open position allowing access to the loading area of the vehicle to a closed position, said vehicle comprising a transparent tailgate mounted on a frame of the rear part of the vehicle, said transparent tailgate being arranged to switch from a first deployed configuration when the reversible opening means is in the open position, to a second folded configuration when the reversible opening means is in the closed position.

* * * * *